US009683782B2

(12) United States Patent
Malkmus et al.

(10) Patent No.: US 9,683,782 B2
(45) Date of Patent: Jun. 20, 2017

(54) METHODS FOR PRODUCING SILICON CARBIDE WHISKER-REINFORCED REFRACTORY COMPOSITION

(71) Applicant: CALDERYS FRANCE, Issy-les-Moulineaux (FR)

(72) Inventors: Patrick Malkmus, Koblenz (DE); Jerome Soudier, Vaux en Bugey (FR)

(73) Assignee: Calderys France, Issy-les-Moulineaux (FR)

( * ) Notice: Subject to any disclaimer, the term of this patent is extended or adjusted under 35 U.S.C. 154(b) by 0 days.

(21) Appl. No.: 14/785,424

(22) PCT Filed: Apr. 17, 2014

(86) PCT No.: PCT/EP2014/057869
§ 371 (c)(1),
(2) Date: Oct. 19, 2015

(87) PCT Pub. No.: WO2014/170424
PCT Pub. Date: Oct. 23, 2014

(65) Prior Publication Data
US 2016/0084576 A1    Mar. 24, 2016

(30) Foreign Application Priority Data

Apr. 19, 2013  (EP) .................................. 13290088

(51) Int. Cl.
*C04B 35/103* (2006.01)
*C04B 35/81* (2006.01)
(Continued)

(52) U.S. Cl.
CPC ................ *F27D 1/10* (2013.01); *C04B 35/10* (2013.01); *C04B 35/103* (2013.01); *C04B 35/18* (2013.01);
(Continued)

(58) Field of Classification Search
CPC ...... C04B 35/103; C04B 35/18; C04B 35/185
See application file for complete search history.

(56) References Cited

U.S. PATENT DOCUMENTS

| 4,326,040 A | 4/1982 | Kaji et al. |
| 4,543,345 A | 9/1985 | Wei |

(Continued)

FOREIGN PATENT DOCUMENTS

| CN | 102153357 A | 8/2011 |
| CN | 102603274 A | 7/2012 |

(Continued)

OTHER PUBLICATIONS

Karamian, E.; Monshi, A.; Bataille, A.; and Zadhoush, A., "Formation of nano SiC whiskers in bauxite-carbon composite materials and their consequences on strength and density", Journal of the European Ceramic Society, vol. 31, 2011, pp. 2677-2685.

(Continued)

*Primary Examiner* — Karl Group
(74) *Attorney, Agent, or Firm* — Finnegan, Henderson, Farabow, Garrett & Dunner LLP

(57) ABSTRACT

Methods for forming monolithic refractory compositions may include providing a particulate refractory composition including 2 to 90 mass-% alumina, aluminosilicate, or mixtures thereof; 2 to 70 mass-% silicon carbide; 2 to 10 mass-% carbon; 1 to 10 mass-% Si powder; 1 to 3 mass-% microsilica; and up to 5 mass-% ferrosilicon. The methods may further include adding an amount of water to the particulate refractory composition to form a uniform mixture, installing the uniform mixture and allowing it to set, such that the monolithic refractory composition is required, and heat-treating the set mixture at a temperature no higher than 1200° C. under atmospheric conditions to form a monolithic refractory composition. The methods may optionally include heat-treating the obtained monolithic (Continued)

refractory composition to form silicon carbide whiskers within the monolithic refractory composition.

20 Claims, 7 Drawing Sheets

(51) Int. Cl.
*F27D 1/10* (2006.01)
*C04B 35/18* (2006.01)
*C04B 35/565* (2006.01)
*C04B 35/626* (2006.01)
*C04B 35/63* (2006.01)
*C04B 35/65* (2006.01)
*C04B 35/66* (2006.01)
*C04B 35/80* (2006.01)
*F27D 1/00* (2006.01)
*C04B 35/10* (2006.01)

(52) U.S. Cl.
CPC ........ *C04B 35/565* (2013.01); *C04B 35/6263* (2013.01); *C04B 35/62665* (2013.01); *C04B 35/6303* (2013.01); *C04B 35/65* (2013.01); *C04B 35/66* (2013.01); *C04B 35/80* (2013.01); *C04B 35/803* (2013.01); *F27D 1/0006* (2013.01); *C04B 2235/3208* (2013.01); *C04B 2235/3217* (2013.01); *C04B 2235/3222* (2013.01); *C04B 2235/349* (2013.01); *C04B 2235/3418* (2013.01); *C04B 2235/3463* (2013.01); *C04B 2235/3826* (2013.01); *C04B 2235/402* (2013.01); *C04B 2235/405* (2013.01); *C04B 2235/422* (2013.01); *C04B 2235/424* (2013.01); *C04B 2235/425* (2013.01); *C04B 2235/428* (2013.01); *C04B 2235/48* (2013.01); *C04B 2235/5276* (2013.01); *C04B 2235/5427* (2013.01); *C04B 2235/5436* (2013.01); *C04B 2235/72* (2013.01); *C04B 2235/80* (2013.01); *C04B 2235/96* (2013.01); *C04B 2235/9692* (2013.01)

(56) References Cited

U.S. PATENT DOCUMENTS

| | | | |
|---|---|---|---|
| 4,753,764 A | 6/1988 | Kamijo et al. | |
| 5,096,858 A | 3/1992 | Das Chaklader et al. | |
| 5,932,506 A * | 8/1999 | Bogan .................. | C04B 35/103 501/100 |
| 8,618,006 B2 * | 12/2013 | Pattillo ................. | C04B 35/013 501/100 |
| 2012/0142518 A1 * | 6/2012 | Pattillo ................. | C04B 35/013 501/89 |
| 2014/0291904 A1 * | 10/2014 | Soudier ................. | C04B 35/103 266/280 |

FOREIGN PATENT DOCUMENTS

| | | | |
|---|---|---|---|
| CN | 102964138 A | | 3/2013 |
| CN | 103011868 A | | 4/2013 |
| EP | 0 309 128 A1 | | 3/1989 |
| EP | 2 565 173 A1 | | 3/2013 |
| JP | 2003137664 | * | 5/2003 |
| JP | 2008/189531 A | | 8/2008 |
| WO | WO 91/04234 | | 4/1991 |
| WO | 2013030301 | * | 3/2013 |

OTHER PUBLICATIONS

International Search Report and Written Opinion issued Nov. 27, 2014, in International Application No. PCT/EP2014/057869.
The State Intellectual Property Office of China First Office Action dated Aug. 29, 2016 and Search Report for Chinese Application No. 201480022101.7 and English translation thereof (16 pages).
Comprehensive Chinese-English Dictionary of Metallurgical Industry, pp. 894-895, 2 pages.

* cited by examiner

US 9,683,782 B2

METHODS FOR PRODUCING SILICON CARBIDE WHISKER-REINFORCED REFRACTORY COMPOSITION

CLAIM FOR PRIORITY

This application is a U.S. national phase entry under 35 U.S.C. §371 from PCT International Application No. PCT/EP2014/057869, filed Apr. 17, 2014, which claims the benefit of priority of European Patent Application No. 13290088.7, filed Apr. 19, 2013, the subject matter of both of which is incorporated herein by reference.

FIELD OF THE INVENTION

The present invention relates to methods for forming monolithic refractory compositions. The invention further relates to refractory compositions produced by such methods, installing of said refractory compositions to form refractory linings, as well as the finished refractory linings.

BACKGROUND OF THE INVENTION

Refractories are materials having properties that make them suitable for use as heat-resistant barriers in high temperature applications. Unshaped refractory materials have the ability to form a joint-less lining, and are often referred to as monolithics. These materials are useful for example as linings for cupola hearths and siphons, in blast furnaces, main, secondary and tilting runners, and more generally in vessels or vessel spouts, ladles, tundishes, reaction chambers and troughs that contain, direct the flow, or are suitable for facilitating industrial treatment of liquid metals and slags, or any other high temperature liquids, solids and gases. Unshaped refractories are typically manufactured in powdered form and mixed with water prior to application. The wet material may be applied as a lining using techniques such as casting, spraying (shotcrete) and gunning followed by setting and drying, prior to firing.

Important properties of refractories are their mechanical, chemical and thermal resistances. Mechanical resistance is commonly assessed using modulus of rupture (MOR; also known as flexural strength) and cold crushing strength (CCS). In the case of refractory materials based on alumina, mechanical improvements can be obtained by the formation of highly mechanically and thermally resistant non-oxide phases (e.g. silicon carbide, silicon nitride, SiAlON), the growth of which is achieved by addition of specific metal containing and non-oxide compounds, and always includes a thermal pre-treatment at controlled temperature in a non-oxidising atmosphere (such as He, $N_2$, Ar, or under vacuum). The skilled person in the art is aware that the presence of specific amounts silicon carbide whiskers in a refractory composition improve the mechanical properties of a finished lining. These whiskers are however difficult to obtain.

U.S. Pat. No. 4,326,040 A discloses refractory compositions formed from (among others) aluminium oxide, silicon carbide and carbon powder wherein the starting materials are fired in the presence of a resin or pitch binder under a non-oxidation atmosphere. The use of resins and controlled atmosphere renders the formation process costly and complex.

U.S. Pat. No. 4,543,345 A discloses refractory compositions formed by hot pressing of, for example, aluminium oxide and silicon carbide whiskers at pressures of at least 28 MPa and temperatures of at least 1600° C. The silicon carbide whiskers are very expensive and extremely carcinogenic and are very dangerous to handle. The dispersion of the silicon carbide whiskers is difficult to achieve and elaborate processing techniques are necessary. With mechanical methods of mixing whiskers and ceramic matrix powders, there is the possibility of whiskers clustering together and whisker damage, and the extent of whisker loading is limited.

U.S. Pat. No. 4,753,764 A discloses formation of a refractory ceramic comprising mixing, for example, silicon carbide powder with whisker formation agents and whisker formation accelerators, moulding the mixture and heat treatment under vacuum and/or Ar at temperatures above 2050° C. WO 91/04234 and EP 0 309 128 A1 also disclose formation of silicon carbide whisker containing refractory compositions involving heat-treatment under inert or non-oxidising atmospheres.

Karamian et al. in J. Eur. Ceram. Soc., 31, 14, 2677-2685, disclose methods for forming refractories comprising as starting materials bauxite, SiC-containing materials, coke and phenol resins. In the firing step, the mixtures were heated under a coke (reducing) atmosphere.

All the above methods of producing various refractory compositions with increased mechanical strength and comprising silicon carbide whiskers require stringent and/or carefully controlled conditions in the formation of the refractories, and especially the heat-treatment step. It is an object of the present invention to provide refractory compositions giving rise to refractory linings having good or improved mechanical properties, and having less complex and expensive formation methods.

SHORT DESCRIPTION OF THE INVENTION

The present invention is defined in the appended claims.

In particular, the present invention is embodied by a method for forming a monolithic refractory composition, comprising the provision of a refractory composition comprising alumina, aluminosilicate or mixtures thereof, silicon carbide, carbon, silicon powder, microsilica, optionally ferrosilicon, and optionally cement; mixing this composition with water to form a uniform mixture; installing said uniform mixture and allowing it to set; and treating the set installed mixture with heat at a temperature no higher than 1200° C., such as for example at a temperature no higher than 1000° C. The method is characterised in that the heat-treatment step is carried out under neutral or slightly oxidising conditions, such as for example under air at atmospheric pressure.

According to one embodiment of the present invention, the heat-treated installed mixture undergoes a second heat-treatment of the monolithic composition, during which further heat-treatment silicon carbide whiskers are formed within the monolithic refractory composition. According to the present invention it has been found that under certain conditions and using specific combinations of components of the refractory composition, silicon carbide whiskers may be formed in a cast refractory composition by using heat-treatment under non-controlled conditions, in other words, the need for providing a vacuum, or an inert or non-oxidising atmosphere during a heat treatment step is avoided. The said second heat-treatment may be carried out at a temperature of up to 1600° C., such as up to 1450° C., such as up to 1400° C., or between 1200° C. and 1400° C., or in a temperature range of 1200° C. to 1600° C.

As a general rule, in the refractory composition, alumina, aluminosilicate or mixtures thereof is present in a range of 2 to 90 mass-%, based on the total mass of the composition, silicon carbide in the range of 2 to 70 mass-%, based on the total mass of the composition, carbon in the range of 2 to 10 mass-%, based on the total mass of the composition, Si powder in the range of 1 to 10 mass-%, based on the total mass of the composition, and microsilica in the range of 1 to 3 mass-%, based on the total mass of the composition. Optional components ferrosilicon and cement may be present in amounts up to 5 mass-% each, based on the total mass of the composition.

Preferred amounts of components in the particulate composition are listed below.

The particulate refractory composition for use in the method according to the present invention may comprise from 5 to 50 mass-% silicon carbide, or from 5 to 20 mass-% silicon carbide, such as form 10 to 15 mass-% silicon carbide, on the basis of the total mass of the particulate composition.

The particulate refractory composition for use in the method according to the present invention may comprise from 1 to 10 mass-% silicon powder, such as from 1 to 5 mass-% silicon powder, such as from 1.5 to 4 mass-% silicon powder, on the basis of the total mass of the particulate refractory composition.

The particulate refractory composition for use in the method according to the present invention may comprise from 1 to 3 mass-% microsilica, such as for example from 1.2 to 2.5 mass-% microsilica, or no more than 1.3 to 2 mass-% microsilica, on the basis of the total mass of the particulate refractory composition.

In one embodiment of the present invention, the mass ratio between metallic silicon powder and microsilica in the particulate refractory composition provided in the initial step is between 1:1 and 3:1, such as for example about 2:1.

The ferrosilicon contained in the particulate refractory composition for use in the method according to the present invention may be present in an amount of from 1 to 4 mass-%, such as from 2 to 3 mass-%, on the basis of the total mass of the particulate refractory composition.

The carbon contained in the particulate refractory composition for use in the method according to the present invention may be present in the shape of carbon black, or as graphite, or as a solid hydrocarbon having a carbon residue of at least about 5% by weight after coking (fusible carbon), or as mixtures of at least two of those. In one embodiment, the carbon is included in the particulate refractory composition for use in the method of the present invention in an amount in the rang of 2 to 5 mass-%.

In one embodiment, the said particulate refractory composition for use in the method is adapted for casting, ramming, gunning, shotcrete (spray casting) or other installation method.

In one embodiment of the present invention, the particulate refractory composition for use in the method according to the present invention is substantially free of $TiO_2$.

Also part of the present invention is a method of forming a monolithic refractory composition, wherein said monolithic refractory composition is a refractory lining, such as a refractory lining for a metallurgical vessel.

Also part of the present invention is the monolithic refractory composition formed according to the method of the present invention.

SHORT DESCRIPTION OF THE FIGURES

The invention will be further illustrated by reference to the following figures.

Figure 1:
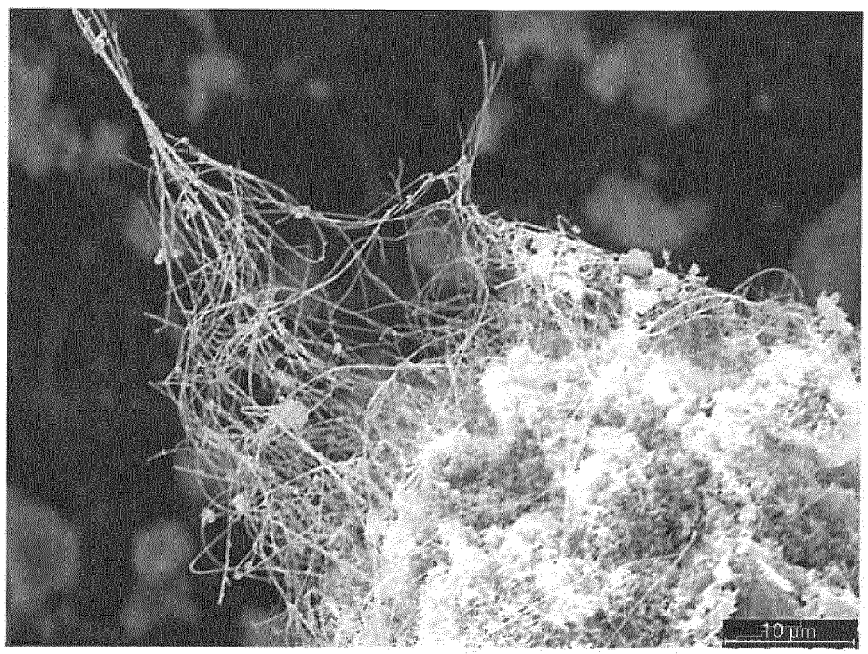
FIG. 1 represents an SEM picture of a monolithic refractory material below the surface zone, obtained according to the method of the present invention.

It is understood that the following description and references to the figures concern exemplary embodiments of the present invention and shall not be limiting the scope of the claims.

DETAILED DESCRIPTION OF THE INVENTION

The present invention according to the appended claims provides a method for forming monolithic refractory compositions, such as monolithic refractory linings for metallurgical vessels, in several distinct steps.

It has been known to the skilled person in the art that refractory compositions with improved physical properties such as higher modulus of rupture and cold crushing strength may be achieved if said compositions comprise silicon carbide whiskers. However, as shown in the discussed state of the art, there has always existed a perceived difficulty of obtaining refractory compositions comprising silicon carbide whiskers, requiring either addition of pre-formed SiC-whiskers into the refractory composition prior to firing, or addition of specific additives to a refractory composition and firing under controlled atmosphere.

According to the present invention, it has been found that silicon carbide whisker containing refractory compositions may be formed, for example when used as refractory linings in metallurgical vessels, by a new process of heat treating the refractory lining at a high temperature under non-inert atmospheric conditions, such as for example during use of the metallurgical vessel or the like. In order to achieve this, a refractory particulate composition as described herein is provided, and mixed with water to form a refractory paste for installation in the required environment and location. The refractory paste is then installed, allowed to set and heat-treated under normal atmosphere at a temperature of no higher than 1200° C., such as for example between 800° C. and 1200° C., or for example between 800° C. and 1000° C. The said heat treatment step at no higher than 1200° C. allows the refractory composition to set, harden and dry, such that essentially no more water is contained in said composition. The obtained monolithic refractory composition then may form a refractory lining which has refractory properties, but which may not yet provide improved physical properties caused by a presence of silicon carbide whiskers. The advantage of the monolithic refractory composition so obtained is that it may serve as a "starting material" for providing a reinforced monolitihic refractory composition containing silicon carbide whiskers.

Silicon carbide whiskers are formed within the monolithic refractory composition during a second heat treatment step, during which the installed monolithic refractory composition after the (first) heat treatment undergoes a further (second) heat treatment at a temperature which is higher than the first heat treatment temperature, under non-inert atmospheric conditions, such as under a normal air atmosphere. During said second heat treatment step, which may be carried out at the same time as normal use of the metallurgical vessel, i.e. wherein some or all of the heat for heat treatment is provided by the presence of a molten metal in contact with said monolithic material, silicon carbide whiskers are formed within said monolithic refractory composition. The formation of said silicon carbide whiskers within said monolithic refractory composition (such as a monolithic refractory lining) then leads to improved physical properties such as increased modulus of rupture and increased cold crushing strength of the refractory lining. The said further heat treatment may be effected entirely or in part by the presence of molten metal, such as molten iron, within a metallurgical vessel lined with said refractory composition, causing the monolithic refractory composition to warm up to a second heat treatment temperature, at which temperature silicon carbide whiskers are formed within said refractory composition and an improved monolithic refractory composition is formed during use thereof.

It has been found that, in the case of monolithic refractory linings for metallurgical vessels, and although at the time of the invention there was a pre-conception that silicon carbide whiskers are not normally formed during heat treatment under normal atmospheric conditions, silicon carbide whiskers can be formed in the non-exposed portions of the monolithic refractory composition, or more precisely within said composition in regions ranging from just below the internal facing surface of the monolithic refractory lining which is in direct contact with the molten metal from which heat is transferred to affect said heat treatment, and towards the external edge of said composition, up to a depth at which a threshold temperature is reached at which silicon carbide whiskers are formed. After an initial heat treatment during which silicon carbide whiskers are formed, the said heat-treatment may be repeated once or several times, such as each time when the metallurgical ladle comprising said refractory composition is in use, by heat transfer from a molten metal to the refractory composition. As the composition of the lining is repeatedly treated at high temperature, silicon carbide whiskers are formed.

During normal use of the metallurgical lining, there will be regular wear and abrasion at the internally facing surface of the refractory lining, causing the portions of the lining close to the internal surface to be worn off, and exposing previously non-exposed regions thereof directly to molten metal providing heat for said heat treatment. As more and more of the said lining wears off at the internal side thereof, the refractory lining will be heated up to a temperature at which silicon carbide whiskers are formed up to a region which lies closer and closer towards the external (wall) facing end of the lining, such that silicon carbide whiskers are formed in regions that did not comprise silicon carbide whiskers prior to repeated heat treatment. In this way, as a refractory lining formed according to the present invention wears off over time and during use, the composition of the lining itself changes such that its physical properties are improved over time, and its lifetime therefore is considerably improved.

According to one aspect of the present invention, an initial monolithic refractory composition is formed by (a) providing a particulate refractory composition comprising among others silicon carbide, (b) forming a uniform refractory mixture by addition of water, (c) installing said mixture where it is required (such as along the internal walls of a metallurgical vessel to a thickness required for providing adequate refractory protection), and (d) heat treating said installed mixture at a temperature such that the installed mixture sets and dries out sufficiently such that it can be used as a refractory lining during use of the metallurgical vessel. Silicon carbide whiskers are formed within said metallurgical vessel during a further (second) step of heat treating said lining, which in one embodiment is carried out during normal operation of the metallurgical vessel through heat transfer from a molten metal, such as molten iron, to said refractory lining.

It has been found that besides the presence of silicon carbide in the particulate refractory composition, the presence of both metallic silicon powder and silica encourage the formation of silicon carbide whiskers under the conditions according to the method of the present invention. The present invention refers to methods for making refractory monolithics, which are installed e.g. by a ramming or casting technique and which are re-enforced by the presence of silicon carbide whiskers, formed in-situ during heating up cycles. The compositions of the materials formed by the inventive method are optimised in their metal, non-oxide and carbon contents, in order to allow the growth of the desired non-oxide (silicon carbide) phases (whiskers), initiated after reaching specific temperatures (e.g. about 1300 to 1400° C.). The method according to the invention does not require a strictly defined atmosphere composition. It was found that the in-situ formation of the silicon carbide whiskers and thus, the re-enforcement effect itself could be achieved by heating up in air.

EXAMPLES

In the following, modulus of rupture (MOR) and cold crushing strength (CCS) were measured in accordance with European Standards EN 1402-5 and EN 1402-6 respectively.

A number of particulate refractory compositions according to Examples 1 to 3 and Comparative Examples 1 to 3 were formed for use in the method according to the present invention. The components of these compositions are listed in Table I:

TABLE I

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Brown fused alumina 0-10 mm | 58.2 | 57.0 | 57.3 | 59.7 | 57.0 | 54.9 |
| Calcined/reactive alumina | 12.6 | 12.3 | 13.9 | 13.0 | 13.0 | 13.3 |
| SiC 95%-99% ≤0.35 mm | 14.6 | 14.3 | 14.4 | 15.0 | 14 | 13.8 |
| SiC 95%-99% ≤1 mm | 4.9 | 4.8 | 4.8 | 5.0 | 5 | 4.6 |
| Microsilica | 1.9 | 1.9 | 1.4 | 1.5 | 3.8 | 1.4 |
| Calcium aluminate cement | 1.5 | 1.4 | 1.4 | 1.5 | 1.4 | 1.4 |
| Carbon carriers | 3.9 | 3.8 | 3.3 | 3.3 | 3.8 | 7.3 |
| Si powder <70 μm | 1.9 | 3.8 | 2.9 | 0.5 | 1.9 | 2.8 |
| Al powder | 0.39 | 0.38 | 0.38 | 0.40 | 0.38 | 0.37 |
| Deflocculants | 0.15 | 0.15 | 0.15 | 0.15 | 0.15 | 0.15 |

The alumina used is particulate brown fused alumina, the particles having a particle size distribution such that all the particles have a particle diameter between 0 and 10 mm. Furthermore, the particle size distribution is chosen so broadly, that substantial amounts of particles are present in each of the particle diameter ranges 0 to 0.2 mm, 1 to 3 mm, 3 to 6 mm and 6 to 10 mm. The carbon carriers used are a mixture of carbon black, graphite and solid hydrocarbon having a carbon residue of at least about 5% by weight after coking (such as e.g. bitumen, asphalt or others). The deflocculants used are a mixture of STPP, anti-caking agents (e.g. sodium naphthalinsulfonate) and citric acid.

The particulate refractory compositions displayed in Table I were mixed with water (4 to 6 mass-%), installed and fired under normal atmosphere at no more than 1200° C., and subsequently fired again under normal atmosphere at 1400° C. or 1600° C., in order to obtain dried blocks of approximately 32 kg finished monolithic refractory material. All blocks had an oxidised zone of material at their surfaces, of a thickness of approximately 7 to 10 mm.

Figure 2:
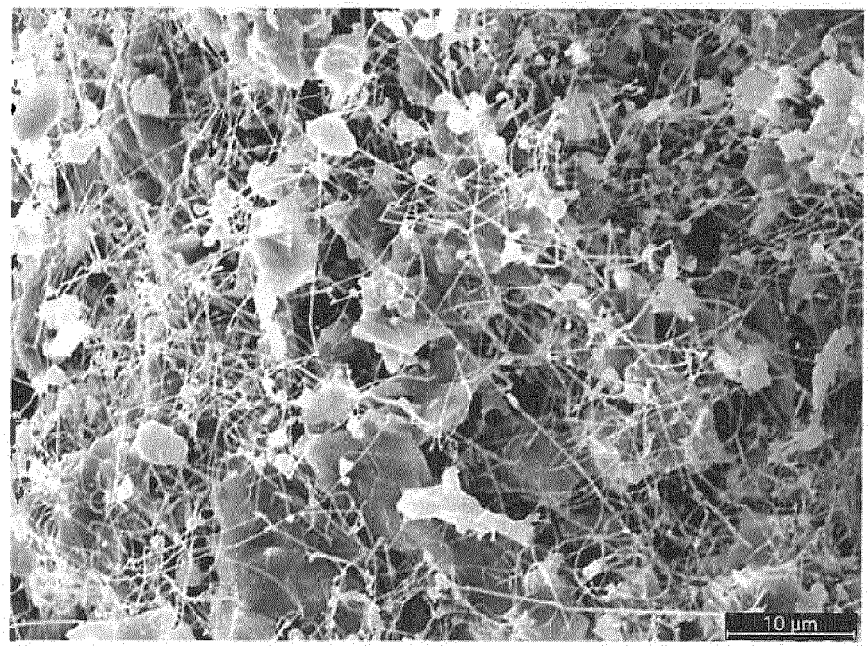
FIG. 2 represents an SEM picture of a surface of a monolithic refractory material, obtained according to the method of the present invention.

FIGS. 1 and 2 show SEM pictures of samples from the monolithic refractory material obtained according to Example 1 above after firing at 1400° C. under normal atmosphere for 5 hours. FIG. 1 is an SEM picture of an internal portion of the said block, which was not exposed to the atmosphere during firing. FIG. 2 is an SEM picture of an external sample of the said block (taken from within 10 mm of a surface), which was exposed to the atmosphere during firing. It can be clearly seen that whiskers are present both internally and on the surface of the block, while the occurrence of whiskers is more frequent internally.

Figure 3:
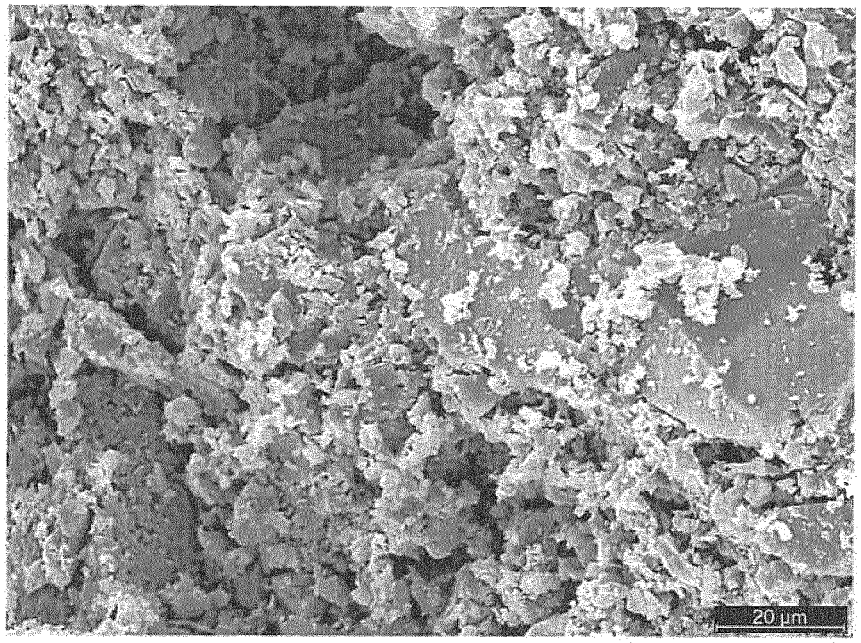
FIG. 3 represents an SEM picture of a monolithic refractory material obtained with to a method not according to the present invention.
Figure 4:
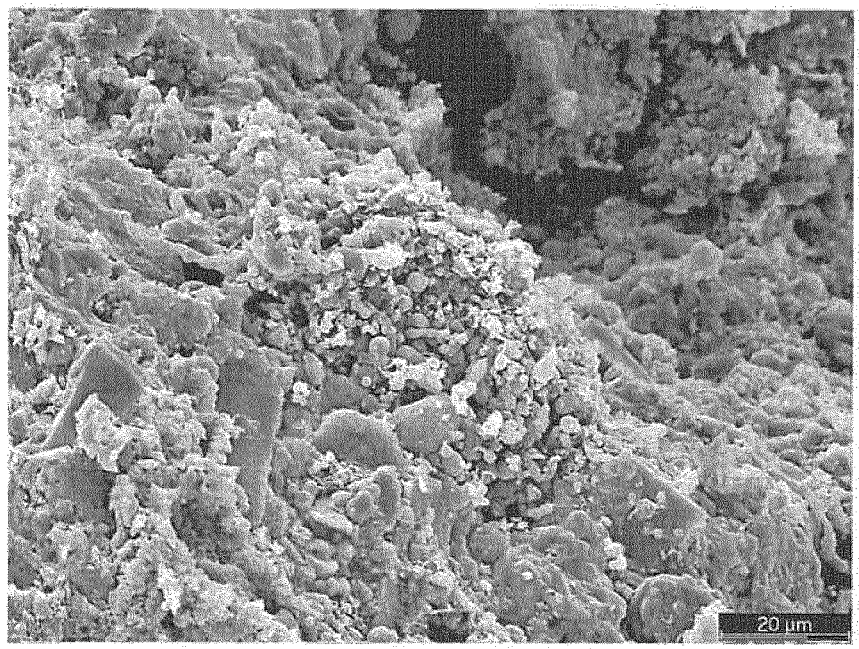
FIG. 4 represents an SEM picture of a monolithic refractory material obtained with to a method not according to the present invention.
Figure 5:
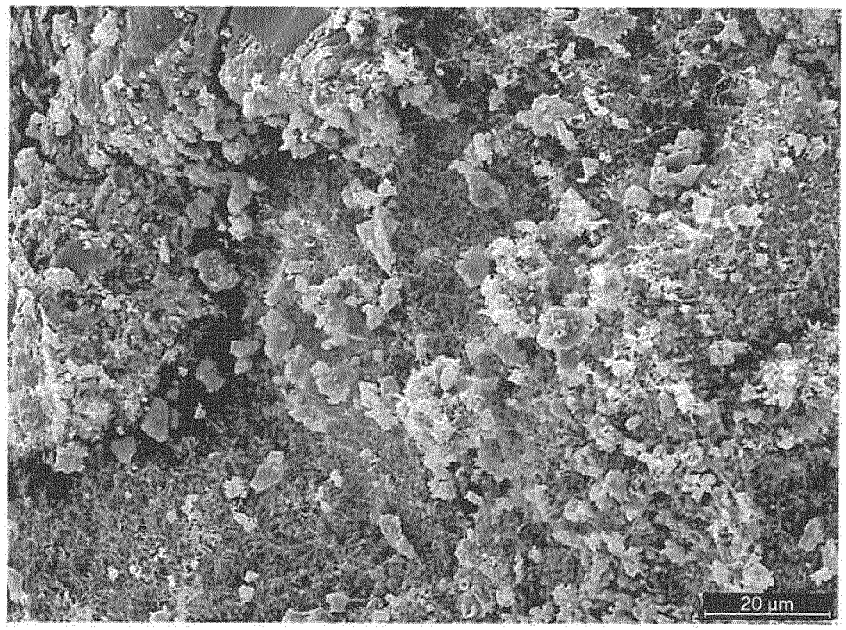
FIG. 5 represents an SEM picture of a monolithic refractory material obtained with the method according to the present invention.
Figure 6:
FIG. 6 represents an SEM picture of a monolithic refractory material obtained with the method according to the present invention.
Figure 7:
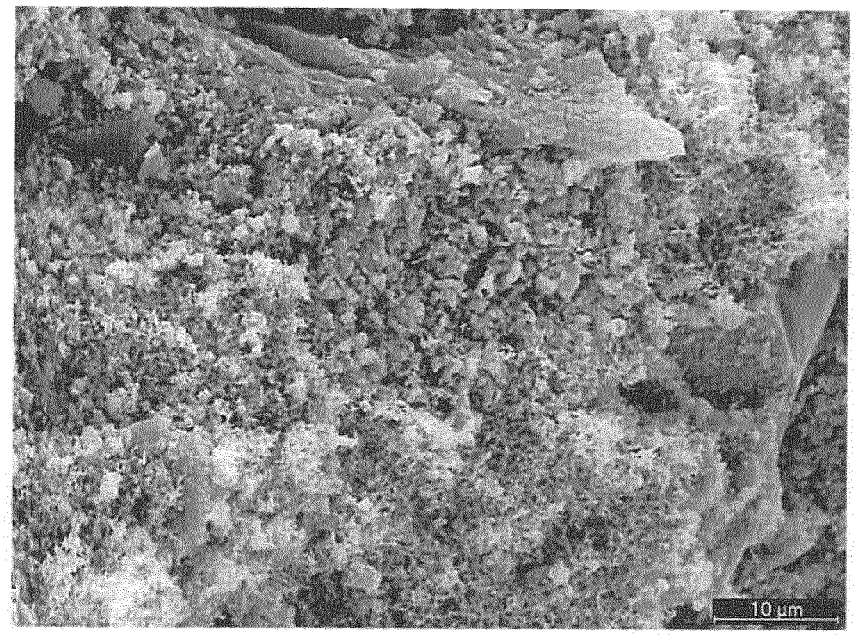
FIG. 7 represents an SEM picture of a monolithic refractory material obtained with the method according to the present invention.
Figure 8:
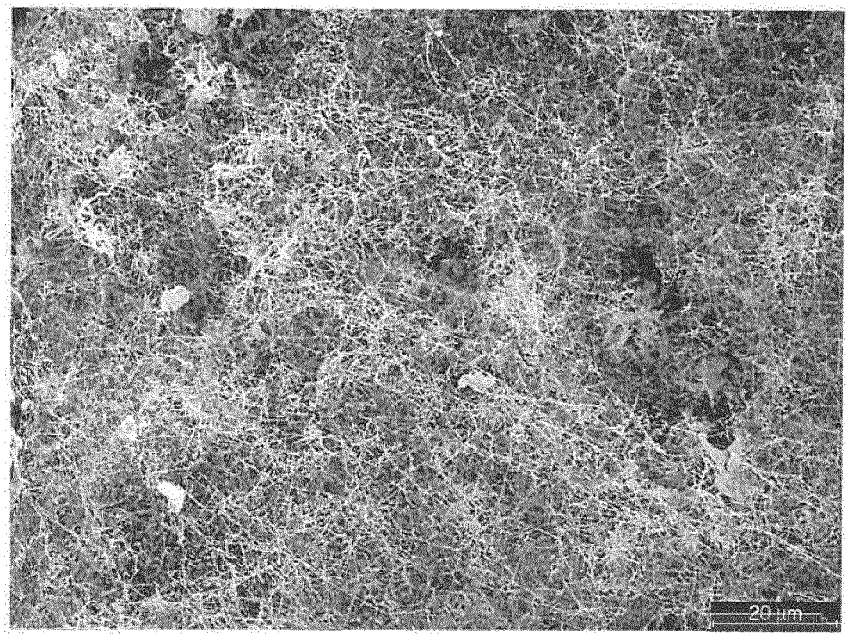
FIG. 8 represents an SEM picture of a monolithic refractory material obtained with the method according to the present invention.

FIGS. 3 and 4 show SEM pictures of samples from the monolithic refractory material obtained according to Comparative Example 1 after firing at 1400° C. and 1600° C. respectively. FIGS. 5 and 6 show SEM pictures of samples from the monolithic refractory material obtained according to Example 1 after firing at 1400° C. and 1600° C. respectively. FIGS. 7 and 8 show SEM pictures of samples from the monolithic refractory material obtained according to Example 2 after firing at 1400° C. and 1600° C. respectively.

In the case of Comparative Example 1, no whisker formation is detected at either firing at 1400° C. nor 1600° C. (FIGS. 3 and 4). In the case of Examples 1 and 2, some whisker formation can be observed after firing at 1400° C. (FIGS. 5 and 7), and strong or very strong whisker formation is detected after firing at 1600° C. (FIGS. 6 and 8).

Furthermore, the mechanical properties of the finished products formed after firing at 1400° C. and 1600° C. using the particulate refractory compositions according to Examples 1 to 3 and Comparative Examples 1 to 3 were measured. The results are shown in Table II:

TABLE II

|  | Ex. 1 | Ex. 2 | Ex. 3 | Comp. Ex. 1 | Comp. Ex. 3 |
| --- | --- | --- | --- | --- | --- |
| MOR (1400° C.) | 12.5 | 12.3 | 11.6 | 9.0 | 8.5 |
| MOR (1600° C.) | 12.6 | 13.0 | 13.6 | 9.6 | 8.4 |
| CCS (1400° C.) | 136.0 | 150.0 | 128.0 | 110.3 | 91.9 |
| CCS (1600° C.) | 126.6 | 136.1 | 141.4 | 98.9 | 79.3 |

N.B. The values for MOR and CCS are expressed in N/mm$^2$

The improved values for modulus of rupture and cold crushing strength are apparent.

Figure 9:
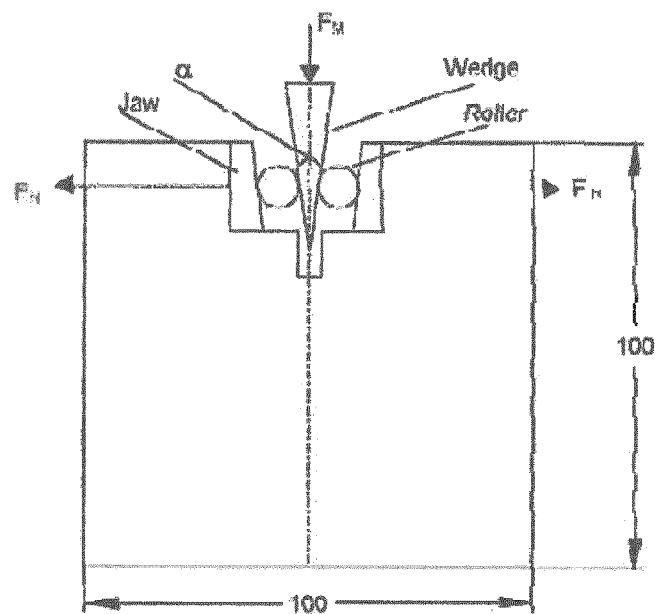
FIG. 9 represents a graphic illustration for carrying out a wedge splitting test on monolithic refractory samples.

The samples obtained using the composition according to Example 1 and Comparative Example 1 were tested by a wedge splitting test. The cubic samples were cast, and fired at 1400° C. for 5 hrs according to the method of the present invention. The test method is represented in FIG. 9. The results of the test are graphically presented in FIG. 10.

Figure 10:
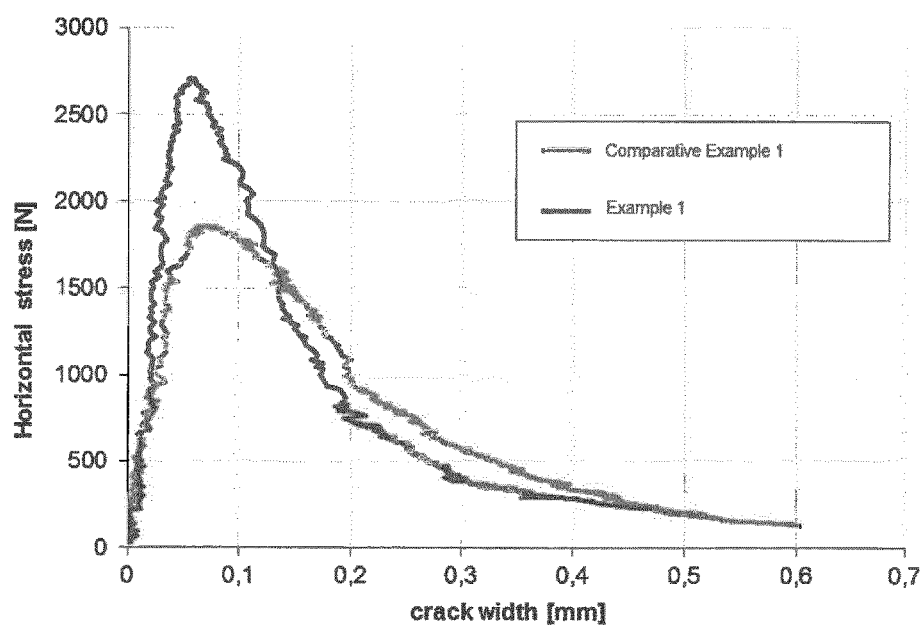
FIG. 10 represents the results of a wedge splitting test on a sample according to the present invention and a comparative sample.

The wedge splitting test was initially developed to characterise the tensile-like behaviour of mineral based composites, which are known to be very brittle. The main parameters obtained from the results of that test are splitting tensile strength (directly correlated to the tensile strength) and the fraction energy (post cracking stability). As is seen in FIG. 10, the material formed according to the present invention withstood notable higher horizontal stress before cracking. The recalculated values of tensile strength were 4.13 MPa and 6.04 MPa for samples of Comparative Example 1 and Example 1 respectively.

The wedge splitting test shows that the resistance against crack-initiation of monolithic refractory compositions formed according to the present invention (Example 1) was clearly better than that of the material formed according to the Comparative Example 1, and that the resistance against crack-propagation was comparable in both cases. Thus whisker formation increases the mechanical strength of material without causing increased brittleness.

Figure 11:
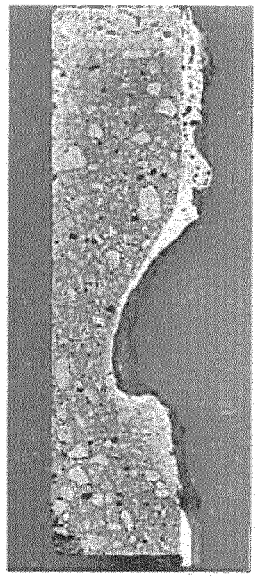
FIG. 11 represents the result of a corrosion test on a sample according to the present invention using "acidic" slag.
Figure 12:
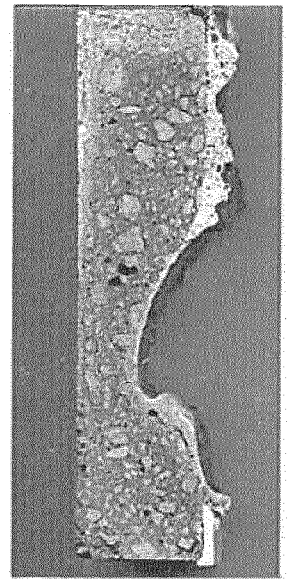
FIG. 12 represents the result of a corrosion test on a sample not according to the present invention using "acidic" slag.
Figure 13:
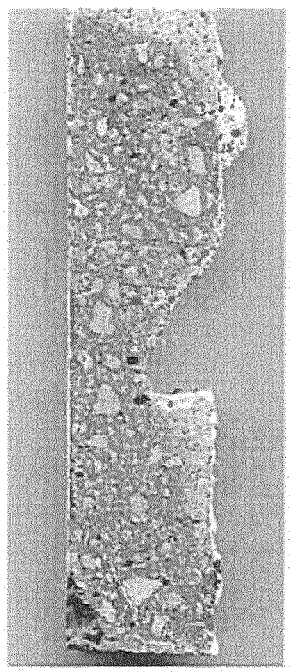
FIG. 13 represents the result of a corrosion test on a sample according to the present invention using "neutral" slag.
Figure 14:
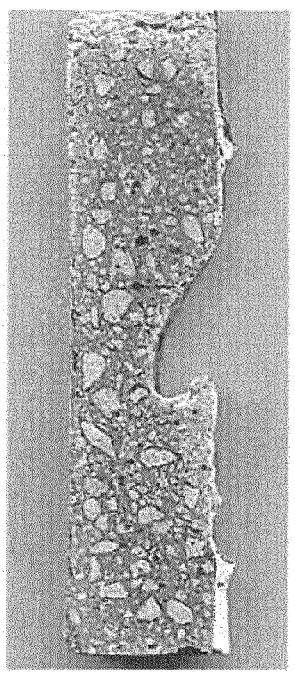
FIG. 14 represents the result of a corrosion test on a sample not according to the present invention using "neutral" slag.
Figure 15:
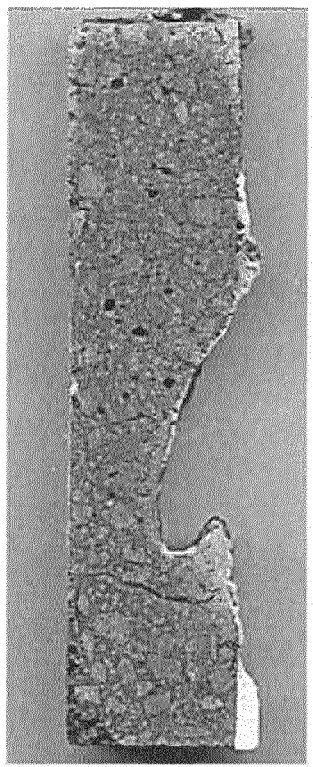
FIG. 15 represents the result of a corrosion test on a sample according to the present invention using "basic" slag.
Figure 16:
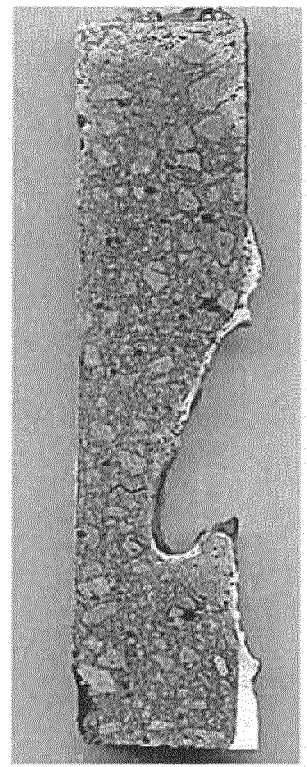
FIG. 16 represents the result of a corrosion test on a sample not according to the present invention using "basic" slag.

Corrosion resistance of the materials formed according to Example 1 and Comparative Example 1 was also tested. The corrosion resistance was tested against iron EN-GJL-250 and three different slags: (a) "acidic" slag of basicity 0.59 (representing acidic cupola slag); (b) "normal" slag of basicity 0.75 (representing normal cupola slag); and (c) "basic" slag of basicity 1.54 (representing the case of runners applications). Samples formed according to Example 1 and Comparative Example 1 were dried and exposed to the various slags for 18 hours case (a) and 8 hours for (b) and (c). The cut sections of the samples after test (a) are shown in FIGS. 11 and 12. The cut sections of the samples after test (b) are shown in FIGS. 13 and 14. The cut sections of the samples after test (c) are shown in FIGS. 15 and 16. The measured corrosion values (in mm²) are shown in Table III.

TABLE III

| | Ex. 1 | Comp. Ex. 1 |
|---|---|---|
| "acidic" slag | 1032 | 1041 |
| "neutral" slag | 662 | 597 |
| "basic" slag | 964 | 957 |

In all cases it is shown that the corrosion resistance of the monolithic refractory materials formed using the particulate refractory materials according to Example 1 and Comparative Example 1 are similar.

It has been shown that monolithic refractory materials formed according to the method of the present invention acquire improved mechanical properties once fired at elevated temperatures under atmospheric conditions, while at the same time not suffering any drawbacks such as increase brittleness or reduced resistance to slag corrosion.

The invention claimed is:

1. A method of forming a monolithic refractory composition, the method comprising:
    (a) providing a particulate refractory composition comprising:
        (i) 2 to 90 mass-% alumina, aluminosilicate or mixtures thereof;
        (ii) 2 to 70 mass-% silicon carbide;
        (iii) 2 to 10 mass-% carbon;
        (iv) 1 to 10 mass-% silicon powder; and
        (v) 1 to 3 mass-% microsilica;
    (b) adding an amount of water to the particulate refractory composition to form a uniform mixture;
    (c) allowing the uniform mixture to set;
    (d) heat-treating said set mixture at a temperature no higher than 1200° C. under atmospheric conditions to form the monolithic refractory composition; and
    (e) heat-treating the monolithic refractory composition to form silicon carbide whiskers within the monolithic refractory composition.

2. The method according to claim 1, wherein in step (a), the particulate refractory composition further comprises up to 5 mass-% ferrosilicon.

3. The method according to claim 1, wherein in step (a), the particulate refractory composition further comprises up to 5 mass-% cement.

4. The method according to claim 1, wherein said step (e) is carried out by contacting said monolithic composition obtained at the end of step (d) with a molten metal.

5. The method according to claim 1, wherein said step (e) of heat-treating is carried out at a temperature of up to 1600° C.

6. The method according to claim 1, wherein step (b) comprises applying the uniform mixture to a vessel by casting, ramming, gunning, or spray casting before allowing the uniform mixture to set.

7. The method according to claim 1, wherein the particulate refractory composition of step (a) comprises from 5 to 50 mass-% silicon carbide, on the basis of the total mass of the particulate refractory composition.

8. The method according to claim 1, wherein the particulate refractory composition of step (a) comprises from 1 to 6 mass-% microsilica, on the basis of the total mass of the particulate refractory composition.

9. The method according to claim 1, wherein the particulate refractory composition of step (a) comprises from 2 to 5 mass-% carbon, on the basis of the total mass of the particulate refractory composition.

10. The method according to claim 1, wherein the carbon in said particulate refractory composition of step (a) is present as carbon black, graphite, fusible carbon, or a mixture thereof.

11. The method according to claim 1, wherein the particulate refractory composition of step (a) is substantially free of $TiO_2$.

12. The method according to claim 1, wherein said monolithic refractory composition forms a refractory lining having a thickness ranging from 7 mm to 10 mm.

13. The method according to claim 1 wherein step (e) of heat-treating is repeated at least once.

14. The method according to claim 13, wherein step (e) of heat-treating is repeated throughout the lifetime of the monolithic refractory composition.

15. The method according to claim 1, wherein the mass ratio of silicon powder to microsilica in the particulate refractory composition of step (a) ranges from 1:1 to 3:1.

16. A monolithic refractory composition formed by the method according to claim 1.

17. A method of forming a refractory composition, the method comprising:
    adding water to a particulate composition to form a mixture, the particulate composition comprising:
        (i) 2 to 90 mass-% alumina, aluminosilicate, or a mixture thereof;
        (ii) 2 to 70 mass-% silicon carbide;
        (iii) 2 to 10 mass-% carbon;
        (iv) 1.5 to 4 mass-% silicon powder; and
        (v) 1.3 to 2 mass-% microsilica;
    depositing the mixture on a surface of a vessel;
    applying a first heat treatment to the deposited mixture at a first temperature ranging from 800° C. to 1200° C. to form the refractory composition, the refractory composition forming a refractory lining on the surface of the vessel; and
    applying a second heat treatment to the refractory composition at a second temperature higher than the first temperature, the second temperature ranging from 1200° C. to 1600° C., wherein the second heat treatment forms silicon carbide whiskers in the refractory composition.

18. The method of claim 17, wherein applying the second heat treatment includes contacting an inner surface of the refractory composition with a molten metal.

19. A method of forming a refractory composition, the method comprising:
    adding water to a particulate composition to form a mixture, the particulate composition comprising:
        (i) 2 to 90 mass-% alumina, aluminosilicate, or a mixture thereof;
        (ii) 2 to 70 mass -% silicon carbide;
        (iii) 2 to 10 mass-% carbon;
        (iv) 1 to 10 mass-% silicon powder; and
        (v) 1 to 3 mass-% microsilica;
    depositing the mixture on a surface of a vessel;
    applying a first heat treatment to the deposited mixture at a first temperature less than 1200° C. to form the refractory composition, wherein the retractory composition has a thickness ranging from 7 mm to 10 mm; and
    applying a second heat treatment to the refractory composition by contacting the refractory composition with a molten metal at a second temperature ranging from 1200° C. to 1600° C., wherein the second heat treatment forms silicon carbide whiskers in the refractory composition.

20. The method of claim 19, wherein the particulate composition comprises 1.5 to 4 mass-% silicon powder with respect to the total mass of the particulate composition, and wherein the mixture comprises 4 to 6 mass-% water with respect to the total mass of the mixture.

* * * * *